(12) United States Patent     (10) Patent No.:    US 9,100,484 B1
Kleck et al.     (45) Date of Patent:    Aug. 4, 2015

(54) SECURE CALL ENVIRONMENT

(75) Inventors: Michael Dean Kleck, Lakewood, CO (US); Einer J. Petersen, Westminster, CO (US); Joshua P. Elson, Denver, CO (US); Daniel C. Rojas, Westminster, CO (US); Richard A. Sadowski, Lakewood, CO (US)

(73) Assignee: ALPINE ACCESS, INC., Denver, CO (US)

( * ) Notice: Subject to any disclaimer, the term of this patent is extended or adjusted under 35 U.S.C. 154(b) by 0 days.

(21) Appl. No.: 13/293,903

(22) Filed: Nov. 10, 2011

Related U.S. Application Data

(60) Provisional application No. 61/412,245, filed on Nov. 10, 2010.

(51) Int. Cl.
*H04M 11/00* (2006.01)
*H04M 3/51* (2006.01)
*H04M 3/42* (2006.01)

(52) U.S. Cl.
CPC ........ *H04M 3/5183* (2013.01); *H04M 3/42323* (2013.01)

(58) Field of Classification Search
CPC . H04M 3/51; H04M 3/42221; H04M 3/5183; H04M 2203/6009; H04M 3/42323; H04M 3/5175; H04M 2203/60; H04M 2203/609; H04M 3/16; G06F 21/60; G06F 21/6245
USPC ........ 379/93.12, 91.01, 91.02, 93.02, 265.01, 379/265.02, 265.06, 265.08
See application file for complete search history.

(56) References Cited

U.S. PATENT DOCUMENTS

| | | | | |
|---|---|---|---|---|
| 5,937,051 | A | * | 8/1999 | Hurd et al. ............... 379/265.02 |
| 5,991,372 | A | * | 11/1999 | D'Ingianni et al. ........ 379/91.02 |
| 6,862,343 | B1 | * | 3/2005 | Vacek et al. ............... 379/88.22 |
| 8,204,180 | B1 | * | 6/2012 | Narayanan et al. ........ 379/88.04 |
| 8,275,115 | B1 | * | 9/2012 | Everingham et al. ..... 379/265.02 |
| 2004/0193897 | A1 | * | 9/2004 | Van Volkenburgh .......... 713/189 |
| 2007/0206765 | A1 | * | 9/2007 | Shaffer et al. ............. 379/265.01 |
| 2010/0128854 | A1 | * | 5/2010 | LaCroix et al. ............ 379/88.04 |
| 2011/0317828 | A1 | * | 12/2011 | Corfield ................... 379/265.02 |

FOREIGN PATENT DOCUMENTS

WO    WO 2009136163 A2 * 11/2009 ............. H04M 3/38

* cited by examiner

*Primary Examiner* — Stella Woo
(74) *Attorney, Agent, or Firm* — Dorsey & Whitney LLP

(57) ABSTRACT

Embodiments may take the form of a secure call environment and methods related thereto. In one embodiment, a secure call environment for conducting a transaction is provided. The secure call environment includes a processor and a memory coupled to the processor storing instructions executable by the processor to provide secure call environment functionality. The secure call environment is configured to create a communication channel between a caller and an agent, record information entered by the caller, and provide the caller entered information to a client application without agent accessibility to the information.

18 Claims, 7 Drawing Sheets

SECURE CALL ENVIRONMENT

CROSS-REFERENCE TO RELATED APPLICATIONS

This application is related to and claims priority to U.S. Provisional Patent Application No. 61/412,245, filed Nov. 10, 2010, and entitled, "Secure Call Environment," which is incorporated herein by reference in its entirety and for all purposes.

TECHNICAL FIELD

The present disclosure generally relates to communication systems and, more particularly, to communication systems securing sensitive data from third parties.

BACKGROUND

Generally, call centers may be configured to handle a variety of call types including incoming and outgoing calls. For example, calls may include telemarketing efforts, political polling, customer service calls, warranty service calls, and so forth. In some cases, the calls may include a discussion of potentially sensitive data that should be treated in a manner to protect the data and/or discussion.

Historically, there have been several different ways that sensitive data has been handled. For example, prior to a caller transferring sensitive data, the call may be passed to an interactive voice response (IVR) system that interacts with the caller to obtain the sensitive information. In some cases, the IVR may recognize voice or dial tones that trigger recording of the sensitive information.

In another example, no transfer of the call occurs but sensitive information, such as credit card information, may be displayed on the screen of the agent handling the call. Moreover, in some instances, a caller may be prompted by the agent to verbally communicate sensitive information to an agent for the agent to enter into the system. As can be appreciated, this may give some security conscious callers anxiety and they may refuse and/or disconnect the call.

It is not uncommon for a company to outsource their calling needs. In such outsourcing arrangements, the outsourcer generally may layer call technology on top of the company's existing base technology to provide functionality for a particular project. Because the outsourcer may not have control of the company's base technology, any blocking or obfuscation of sensitive data can be difficult. This is particularly true where the outsourcer has implemented home based systems for their agents, the agents work from home using their own phone lines and computers.

SUMMARY

There is provided a secure call environment system, and methods related thereto, for the transfer of sensitive information. In the system, no sensitive data is seen or heard by an agent, no sensitive data resides on an agent computer, and the process is intuitive to the agent and the caller. Thus, there is typically no, little or controlled negative impact on call center metrics such as number of calls, time of calls, and the like. In many cases, system implementation may positively impact call metrics.

Embodiments may take the form of a secure call environment and methods related thereto. In one embodiment, a secure call environment for conducting a transaction is provided. The secure call environment includes a processor and a memory coupled to the processor storing instructions executable by the processor to provide secure call environment functionality. The secure call environment is configured to create a communication channel between a caller and an agent, record information entered by the caller, and provide the caller entered information to a client application without agent accessibility to the information.

In another embodiment, a telephonic branch exchange is provided that includes a conference bridge for creating a communication channel between a caller and an agent, and a listener in communication with the conference bridge. The listener is configured to determine if a caller is entering information. The branch exchange also includes a broker in communication with the listener and configured to store caller entered information independent of the agent.

In yet another embodiment, a method for providing a secure call environment includes receiving a call at a private branch exchange, requesting an extension identifier from an agent, and creating a communication channel between the agent and the caller. The method also includes generating a unique identifier using the extension identifier which is associated with the call and receiving a request from the agent to receive user entered information. The request includes the unique identifier. Tables are generated to receive caller entered information and caller entered information is received into the tables. The caller entered information is obfuscated from the agent.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
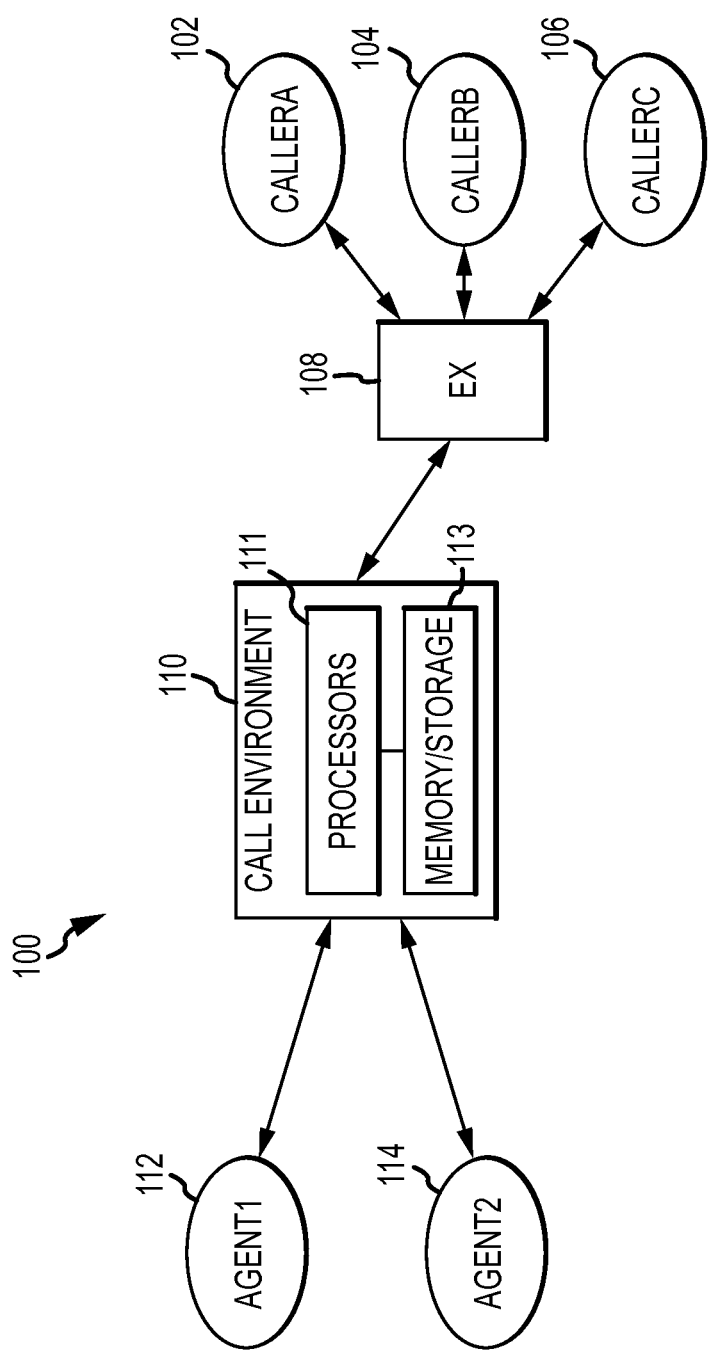
FIG. 1 illustrates an example telephonic network with a call environment, agents and callers.

A secure telephony system and related methods are described herein. The system may provide for secure transfer of sensitive data over a telephone communication. In some embodiments, the system and methods may be implemented as part of an integrated call environment system that prevents sensitive consumer information such as credit card information from being seen, heard or recognized by an agent working for a call center. Thus, a consumer's sensitive information is protected from misuse.

The system may be implemented on one or more computer server(s) owned and/or operated by the call center. In some embodiments, the system may be implemented as various software layers providing call environment functionality over software owned and operated by an entity separate from the call center. Thus, the system may be implemented and integrated in conjunction with other systems.

Further, the system may provide for continuous monitoring of a communication between a consumer and an agent. The monitoring provides for in context recognition dial tone multiple frequency (DTMF) signals indicating entry of potentially sensitive data by a consumer. Upon recognition of such entry in the proper context, the system may filter the DTMF so that it is not heard and/or recognized by the agent.

In some embodiments, the agent may request entry of sensitive information. During entry of the sensitive data, the agent is unable to hear, see and/or recognize or discern the sensitive data, but remains in communication with the consumer. Thus, the agent may be able to assist the consumer if there is any difficulty and/or confusion.

In some embodiments, the agent may indicate that a caller is to enter sensitive data and a broker may receive the sensitive data. In some embodiments, the broker may take the form of a hardware and/or software package operated by a computing device (e.g., the one or more server(s)). The broker may be configured to determine if an agent has an open communication channel with a consumer (e.g., the agent is on a call with the consumer). If it is determined that the agent has an open communication channel with a consumer, the broker may create a unique identification (UID) and associate the UID with the agent's extension. The broker may then create tables into which sensitive data or data entered by the consumer may be saved. The UID and extension may be used to associate the sensitive data with a particular call.

In some embodiments, while the consumer enters sensitive data, an agent's terminal or display may indicate the entry of digits by filling in an area with data entry indicators. For example, in some embodiments a blank field may be displayed until data is received from the consumer. When data is received from the consumer, an "x" may appear in the field for each digit entered. Thus, the agent may confirm the entry of data but may not be able to recognize the data.

Upon a failed attempt to enter information, the agent may request authorization to enable the agent to view, hear and/or enter sensitive data manually. In some embodiments, authorization includes contacting a supervisor that may provide authorization. The request for override that is sent to the supervisor may include information related to the call for which authorization is requested. Additionally, a log may be generated for the authorization request and used for later analysis.

Referring to the drawings, FIG. 1 illustrates an example telephone network 100. The telephone network may provide telephonic communication capabilities to multiple callers 102, 104, 106. The telephonic communications may be conducted using one or more different technologies. For example, in some embodiments, analog or digital telephones may be used. In other embodiments, voice over internet protocol (VoIP) may be used.

Telephonic communications to and/or from the multiple callers 102, 104, 106 may be routed to an exchange 108. The exchange 108 may be communicatively coupled to one or more other exchanges (not shown) and, in some embodiments, may convert analog communications to digital communications for further transmission.

The telephone network 100 may enable a caller to contact or to be contacted by a call center. In either event, the call may be routed through an call environment 110. In some embodiments, the call environment 110 may take the form of a private branch exchange (PBX) that is customized to provide security to telephonic communications handling sensitive information. As such, the call environment 110 may include processors 111 and memory/storage 113. In some embodiments, the processors 111 may take the form of controllers or microcontrollers. The memory 113 may take the form of any suitable computer storage or memory media including random access memory, read only memory (ROM), electrically erasable programmable ROM, flash, hard disk drive, and/or the like. The processors 111 and memory 113 may be housed in one, several or many server racks and/or may be geographically dispersed, but configured to operate in conjunction with each other. The memory/storage 113 is coupled to the processors 111 and is configured to store operating instructions executable by the processors and/or data related to operations of the call environment 110.

Regardless of a particular implementation, the call environment 110 may provide functionality such as connecting, maintaining and disconnection a communication channel between a caller and an agent. Specifically, when a caller is calling into a call center, the call environment may connect the caller to an agent (e.g., agent 112 or agent 114), commonly based on the availability of the agent (e.g., first available agent). Conversely, if the agent is contacting a caller the call environment or other associated server may dial the caller autonomously and connect the agent with the caller only after the caller has answered the call.

It should be appreciated that the agents 112, 114 may be geographically distributed in some embodiments. For example, the agents 112, 114 may work from home and take calls on their home phones and enter data and or read dialogues from their home computers. As such, the call center may be a geographically distributed network. In other embodiments, the agents 112, 114 may be located within a common physical structure with the hardware associated with the call center, such as phones, computers, and/or the call environment 110.

Generally, the communication between the agents 112, 114 and the call environment 110 may take the form of an Internet standard communication. For example, in some embodiments, the communication may take the form of a session initiation protocol (SIP) that provides for voice and video calls over the Internet, although in other embodiments, other protocols may be implemented. Additionally, in some embodiments, the communications between the call environment 100 and the callers 102, 104, 106 may generally include communications over a publicly switched telephone network (PSTN or plain old telephone service (POTS)). However, in some embodiments, the communication between the call environment 110 and one or more callers 102, 104, 106 may be via an Internet standard such as a VoIP standard. In embodiments where the communication between the call environment 110 and a caller 102 is via PSTN, the communication may arrive in an analog or digital form that is translated by the call environment 110 into IP packets for further processing.

It should be appreciated, that although the foregoing has been presented with specific examples, the communication channels between the callers 102, 104, 106 and the agents 112, 114 may take any suitable form and may be across one or more different communication standards and/or mediums. For example, a single communication channel between the caller 102 and the agent 112 may be communicated over twisted pair, fiber optic, Ethernet, and/or wireless communication segments. Furthermore, the communication channel may include conversions from analog to digital and/or from digital to IP, for example.

For the sake of simplicity, a communication between a single caller and a single agent will be described below and shown in the drawings. However, it should be appreciated, that the call environment may be scalable to handle several or many calls between multiple agents and callers simultaneously.

Figure 2:
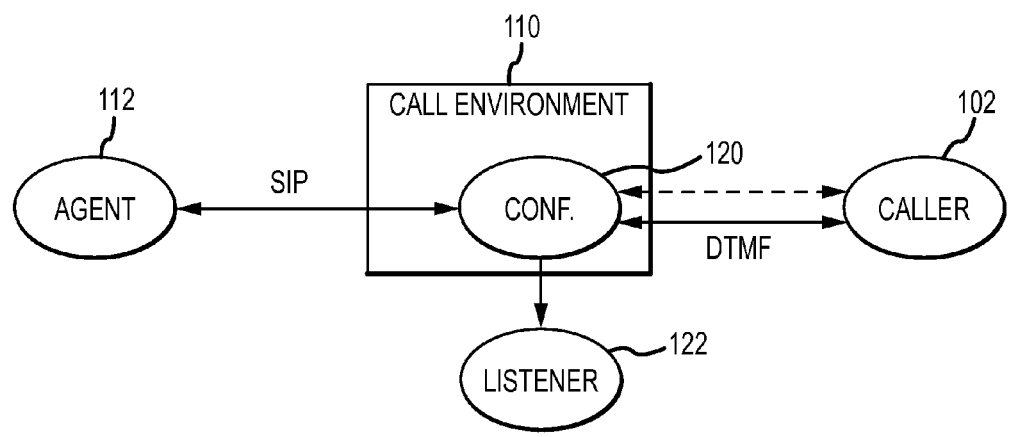
FIG. 2 illustrates an example communication between a caller and an agent via the call environment of FIG. 1.

Turning now to FIG. 2, a call between the caller 102 and the agent 112 is illustrated as being routed to the call environment 110. As mentioned above, the connection between the caller 102 and the call environment 110 may be via PSTN or other telephone communication mode. Additionally, the communication may carry DTMF signals to the call environment 110. The communication channel between the agent 112 and the call environment 110 may be via any suitable communication mode. Generally, the communication channel may take the form of an IP communication standard, such as Sessions Internet Protocol (SIP), for example IETF SIP 2.xx, which provides for voice and data communications. Thus, the agent may simultaneously receive and transmit voice packets and data packets. In particular, the data packets may be received and transmitted via a computing system local to the agent 112, that may include a graphical user interface configured to display information related to the call with the caller 102. The agent 112 may interact with the local computing system (e.g., enter data, read scripts, view information received from or about the caller, and so forth).

The connection between the caller 102 and the agent 112 may be via a conference bridge 120. The conference bridge 120 receives and routes communications between the caller 102 and the agent 112. A listener 122 may monitor or otherwise check for DTMF signals arriving at the conference bridge 120. Any DTMF signals received at the conference bridge 120 are blocked from passing through. In some embodiments, the DTMF signals are removed from the communication channel so that the agent 112 is unaware of the content of the information (e.g., numbers, characters, dates, names, and so forth) entered by the caller 102. For example, segments in packets that are transmitted to the agent 112 may be treated so that DTMF signals and/or any related information does not arrive at the agent 112. In some embodiments, the tones may be modified to have a uniform sound that is not discernable as a distinct numerical entry or other entry. The sound would allow the agent to know that the caller 102 is entering information, but prevent the agent from discerning the content of the entry.

In some embodiments, the agent 112 may request for certain information to be entered by the caller 102, such as birthday, credit card information, account information, and the like. The agent may provide an indication (e.g., via input to a computer or phone) that such information has been requested to allow the call environment to prepare to receive the information. In other embodiments, the user may begin entering information and the call environment 110 may perform a setup process while receiving the information. Thus, the call environment 110 may be configured to constantly poll for any entry of DTMF signals. In some embodiments, the polling may be handled by a broker 130 within the call environment 110.

The broker 130, as with the listener 122, may be hardware and/or software within the call environment 110 that perform or execute particular functions, as described herein. In some embodiments, the listener 122 may be a subroutine within the broker 130, or vice-versa. One function of the broker 130 may include the setup process for receiving information from a caller and receiving/storing the information from a caller.

Figure 3:
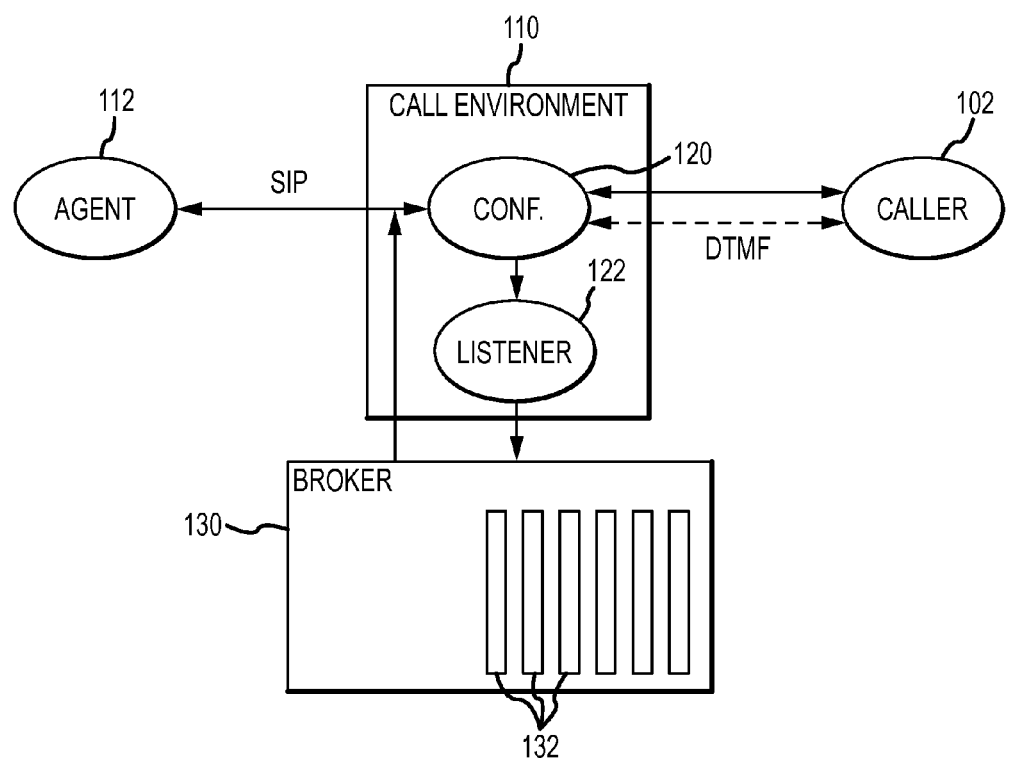
FIG. 3 illustrates the communication of FIG. 2 with a broker associated with the call environment configured to record caller-entered data.

FIG. 3 illustrates the broker 130. For setup, the broker 130 initially determines if the agent 112 is connected to the call environment 110. If it is connected to the call environment 110, the broker collects the agent's extension. In some embodiments, the broker 130 may automatically collect the extension number. In other embodiments, the agent may enter the extension number. The broker 130 determines if the agent is currently engaged in a call. That is, the broker 130 determines if the agent 112 is connected with the caller 102 in an active communication channel. If so, the broker 130 issues a unique identifier (UID). The UID may be used to correlate any received information with the agent and a particular call/caller.

The broker 130 also may create tables 132 upon issuance of a UID into which information received from the caller 102 may be entered. In some embodiments, each of the tables 132 can have a specific size, such as a size corresponding to a credit card account number. In other embodiments, the size of the tables 132 may not be correlated to a particular string length. That is, the size of the tables 132 may be arbitrarily selected as long as it is large enough to receive the desired information from the caller 102.

In the correct context, each digit entered by the caller 102 is received by the conference bridge 120. The listener converts the received DTMF signals to digits and transmits the digits to the broker 130. The broker 130 populates the tables 132 with the digits. The conference bridge 120 may convert the DTMF signals into a form that is amenable to being stored in the tables 132. For example, the DTMF signals may be converted into a digital format for entry into the tables. It should be appreciated that the tables may be configured to receive any sensitive information, including any level 4 information, such as social security numbers, credit card numbers, card verification value, birthday, and the like, or non-sensitive information. Furthermore, the tables 132 may be configured to receive numerical and non-numerical information such as characters, symbols, and so forth.

Figure 4:
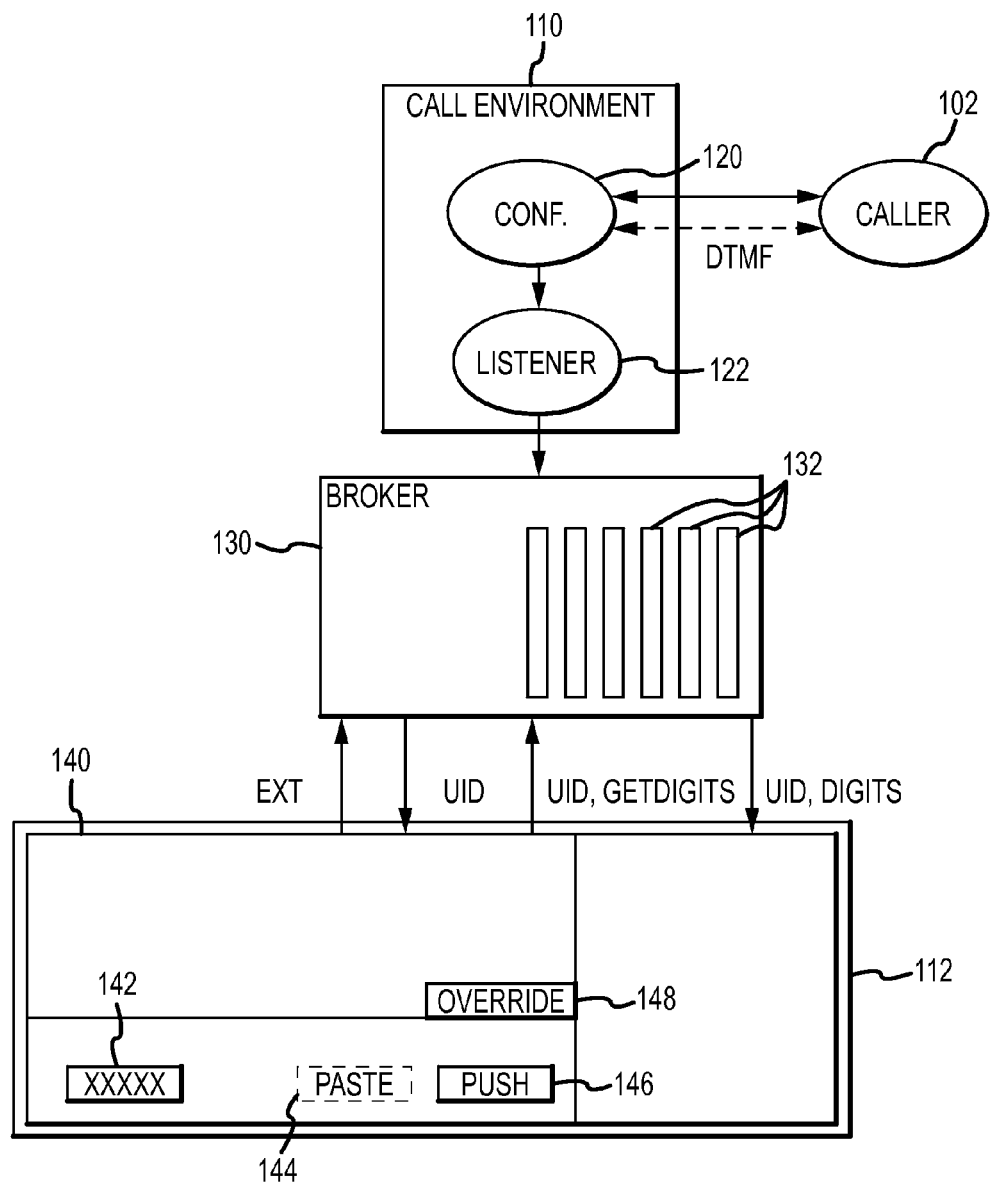
FIG. 4 illustrates the communication of FIG. 2 with an agent application for interacting with the call environment.

FIG. 4 illustrates an example agent application 140 having a graphical user interface (GUI) that may be seen by the agent 112 during the call. The agent application 140 may be an application that is executed by the call environment 110 or other network accessible computer that allows for the agent 112 to interact with the call environment 110 and/or the broker 130, such as the agent's computer. For example, as mentioned above, the agent 112 may have a particular extension that is provided to the broker 130 for setup purposes and may receive a UID for the identification of the call/caller with the agent. The UID may be used to identify any communication between the agent 112 via the agent application 140 to broker 130, for a particular call. Each unique call has a different UID.

In some embodiments, the agent application 140 may run on a virtualized desktop accessible by the agent 112 upon logging in to the call environment 110. In other embodiments the virtualized desktop may be accessible via the Internet, a cloud computing environment, or other network accessible virtualization server. In some embodiments, agent access the virtualization server and the agent application 140 is provided by a server which may be running/operating suitable virtualization software, such as that provided by Citrix®, for example.

The GUI of the agent application 140 may include one or more fields that represent the entry of data by a caller. For example, a credit card field 142 may be provided to indicate the entry of credit card information. The agent application 140 may also provide functionality such as cut and paste 144, push 146, and override 148, just to name a few possible functions. In some embodiments, certain functions may be invisible, "grayed out" or otherwise inaccessible during certain periods of time. For example, in some embodiments the cut and paste functionality may be inaccessible during certain periods, such as when the caller is entering data. Additionally, as the caller 102 enters data, the field corresponding to the data that is entered by the caller may provide an indication that the user is entering data. For example, if the information is generally not sensitive information, the user may be able to view the data that is entered. However, if the information is sensitive, the indication may take the form of "x's" that represent one or more digits entered. In other embodiments, other visual indicators may be provided, such as a blinking icon or movement of the cursor. In still other some embodiments an indication may be provided after a certain number of digits are entered, if an error has been detected, or after a certain period of time has lapsed and the caller has not entered data that is expected. Thus, the agent may know that the caller is entering information but not know what the information is. In some embodiments, no information may appear on the screen, but rather audible indicators maybe provided. In other embodiments, the agent 112 may be provided with no indication of data entry by the caller 102.

In some embodiments, the agent application 140 may be utilized by the agent 112 to indicate to the broker 130 that the caller 102 is to enter data. For example, the agent 112 may select the push field 146 which may send the agent's extension to the broker 130 and initiate the setup process. The UID may be received in return and polling for data entry by the caller 102 may begin. Upon receipt of the data, the corresponding field may be filled with x's. In some embodiments, when receiving data, certain portions of the data or certain digits may be displayed. For example, in some embodiments, the last four digits of a credit card number may be displayed. In some embodiments, when a call is terminated or ended, and the UID is no longer valid, any stored numbers are discarded and the process terminates.

Certain information may be discerned by the entered data. For example, in some embodiments, at least one of the broker 130, the agent application 140, or another device or routine, may be configured to determine a type of credit card after the first four digits are received. This or other information may be used to determine if an error has been made in the data entry process and the agent may be notified. In some embodiments, a flag may appear on the GUI if a caller 102 enters too many digits. In some embodiments, the agent 112, application 140 or caller 102 may enter a particular symbol, digit or pattern that may restart the process to re-enter digits. For example, if the caller 102 enters a particular symbol, such as "*", then any data stored in the current table may be deleted and subsequent data may be entered into the table from the start of the table or to restart the process. If the caller 102 enters a particular symbol, such as "#", then the broker 130 may move to the next table for receipt of any additional data and the broker 130 or application 140 may run a check to determine if the data entered is valid, for example if the credit card number is valid.

Figure 5:
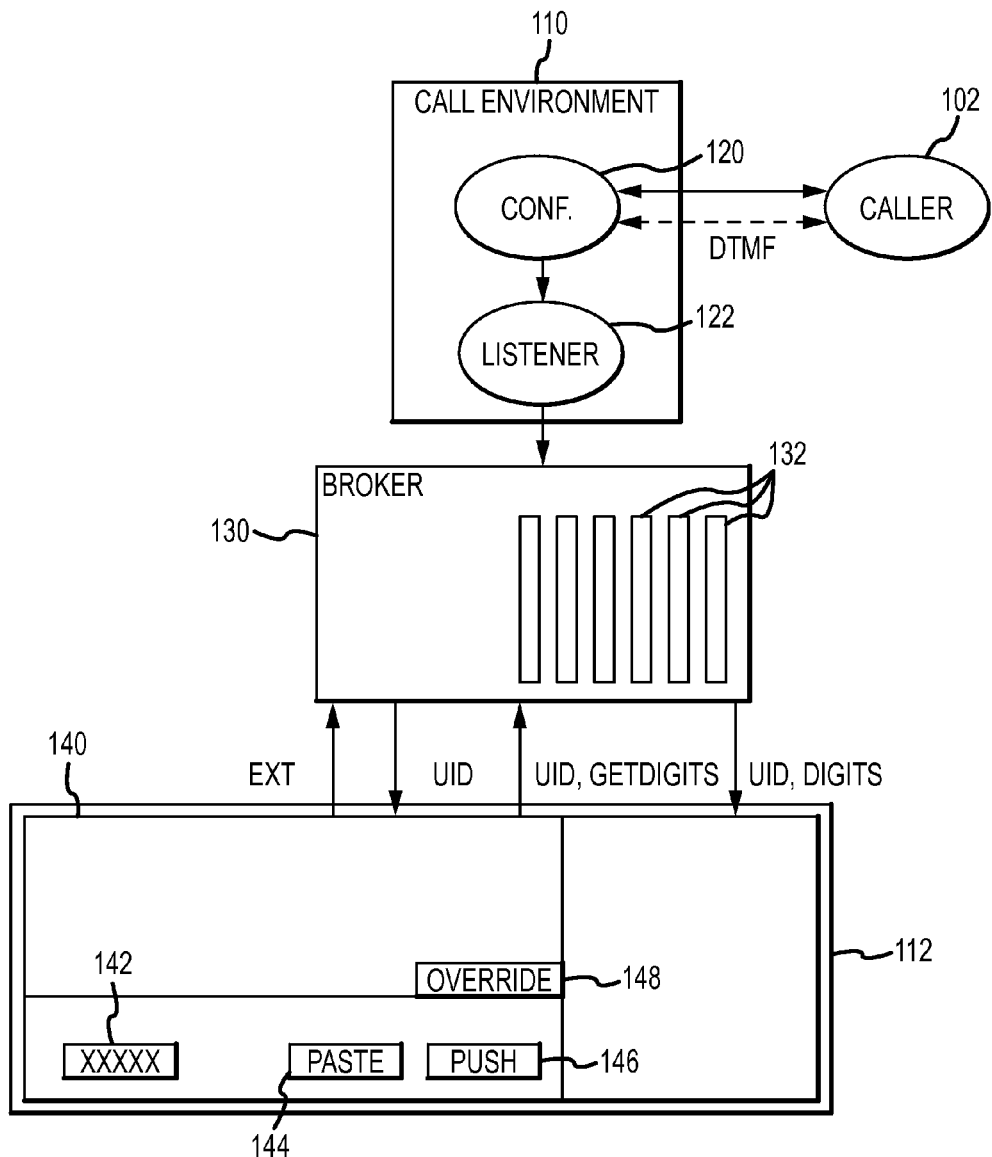
FIG. 5 illustrates the communication of FIG. 2 with the agent application of FIG. 4 having additional functionality.

Once it is determined that the data received is acceptable (e.g., the credit card data is correct and valid), the paste functionality may be activated in the GUI, as illustrated in FIG. 5. The paste functionality may allow for the agent to copy and paste fields into a client application. If there are multiple fields, then multiple fields may be copied and pasted into the client application. In some embodiments, the data from the tables 132 of the broker 130 is transferred into the fields of the client application 160 or transferred to the agent application 140.

Figure 6:
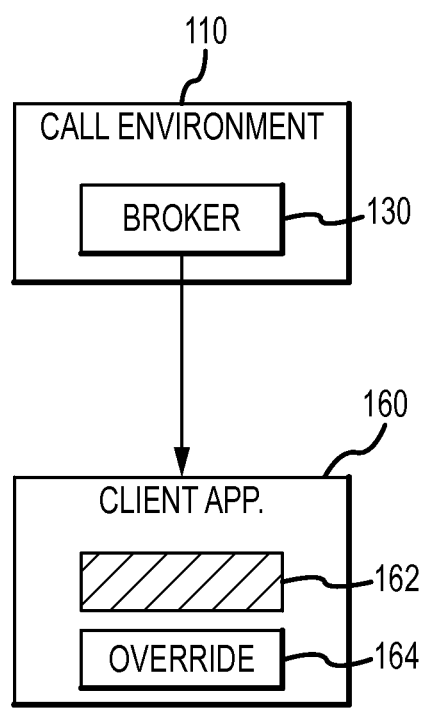
FIG. 6 illustrates a client application receiving information from the broker of FIG. 3.

The client application 160 (FIG. 6) may represent an application developed and used by a company that has hired a call center to conduct their telephonic business and into which caller data is entered for completion of a transaction between the caller and the company. As such, the client application 160 may not be controlled by the call center and may not be directly associated with the call environment 110.

The client application 160 may include one or more fields 162 into which the caller data may be entered. The agent application 140 may obscure the fields 162, or information therein, in order to hide any sensitive data. The agent application 140 may also include an authorization button 164 that may allow for erasure of data contained in the fields 162.

Figure 7:
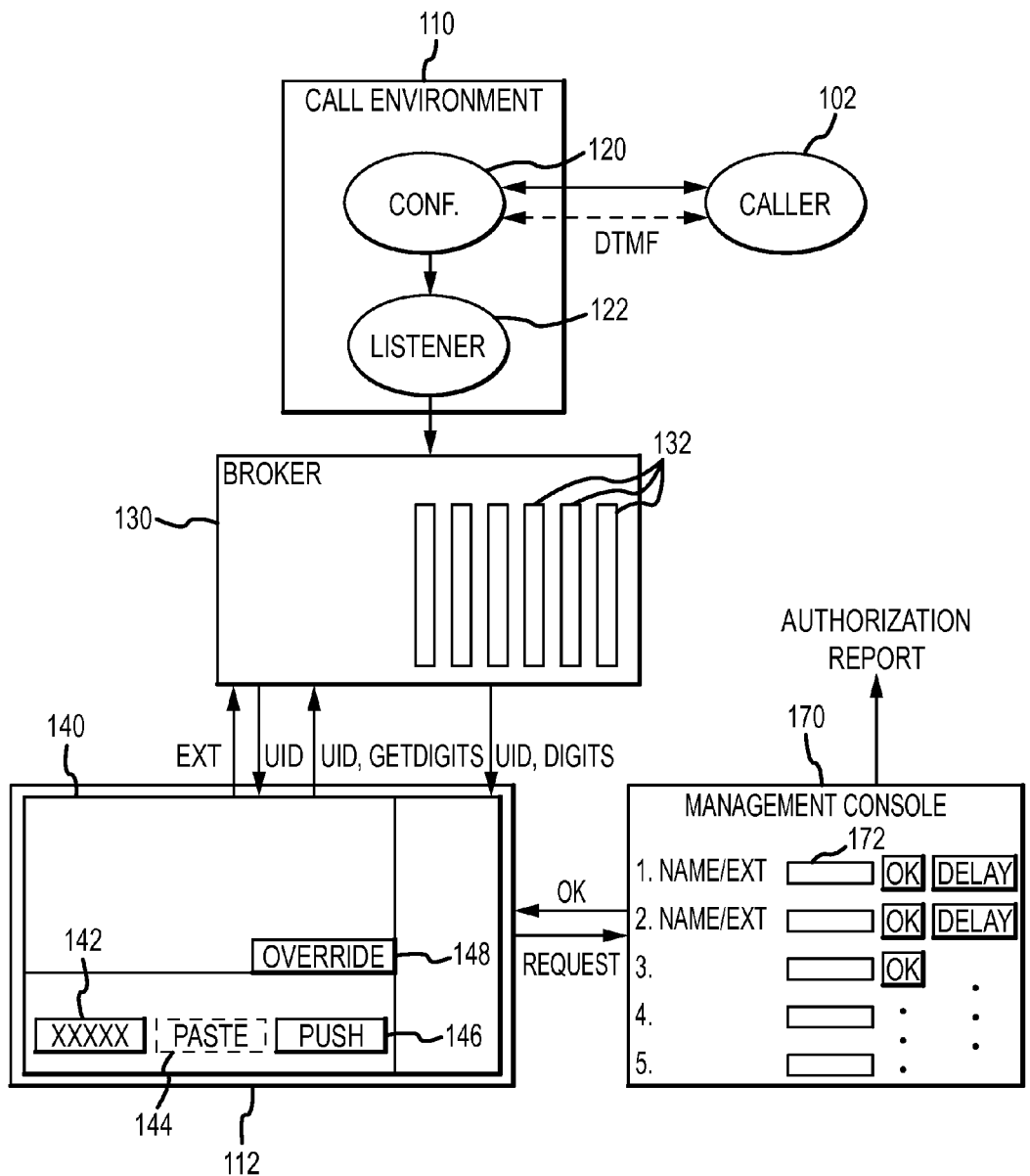
FIG. 7 illustrates a management console receiving information related to the communication of FIG. 2 upon receiving an authorization request.

Turning to FIG. 7, the authorization button 148 may allow for the agent to request override authority to overcome the security features (e.g., obfuscation features such as hiding DTMF signals, not showing data entry on the client application GUI 140, and so forth). In particular, upon the agent 112 selecting the authorization button 148, a manager may be contacted. The manager may have access to a management console 170 that may allow the manager to monitor activity of agents. In some embodiments, the management console is accessible by the manager by logging into the server and the management console provided as a virtualized desktop.

The management console 170 may display information relate to override requests. Upon receipt of an authorization request, the management console 170 may display the name and extension of the agent requesting authorization, and/or other information (such as the number of previous overrides requested by the agent). Buttons 172 may be provided to allow the manager to permit override or deny the authorization request. A log is generated by the management console 170 of all override requests and their result (e.g., if they are granted or denied). The log may be provided as an authorization report to audit personnel or stored for future audit information, for example. Additionally, each override may be time stamped for subsequent audit or informational purposes.

Upon a grant of authorization, security features may be removed and the agent 112 may obtain access to the sensitive data from the caller. For example, in some embodiments, the data entered by the caller may be visible on the agent application GUI 140. In some embodiments, the caller 102 may verbally tell the agent 112 the sensitive data and the agent may enter the data. That is, authorization may allow for the agent 112 to enter data directly into the client application by opening the pertinent field for manual entry of the data. Authorization is granted on a per call basis and may be associated with a UID. Hence, upon termination the call for which authorization has been granted, authorization ceases.

In some embodiments, the entire call may be recorded for audit/informational purposes. As such, a review of the recordings may help determine if a particular agent on a particular call should have requested authorization or not. In other embodiments, calls may be buffered. If a call is buffered, it may be saved in the event the agent requests an authorization, thus allowing complete information to be available for later auditing. In some embodiments certain triggering events may initiate a record of the calls. For example, if a particular call has exceeded a certain amount of time (e.g., more than five minutes) the call may be recorded. In another example, if it is determined that the caller is having difficulty properly entering data (e.g., the caller has failed once to enter the data properly) the call may be recorded for auditing purposes.

Thus, there may be added security to the system even in the event that an authorization is provided.

It should be appreciated that throughout the data entry process, the caller 102 and agent 112 remain in communication with each other. As such, if the caller 102 is having difficulty, the agent 112 may ask if the caller wants assistance or may provide additional help or instructions to the caller. The human interaction permitted by the system helps to eliminate confusion, frustration and/or discomfort the caller 112 may experience if the caller were working with a fully automated data entry system. Furthermore, this configuration allows for the agent 112 to better determine when an authorization request may be submitted based on the interaction with the caller.

The foregoing discussion describes some example embodiments to achieve secure call environment functionality. Although the foregoing discussion has presented specific embodiments, persons skilled in the art will recognize that changes may be made in form and detail without departing from the spirit and scope of the embodiments to achieve the similar security provided by the embodiments disclosed herein. For example, in a time division multiplexed embodiment, the communication channel may be tapped and listened to for DTMF. Alternatively, in a SIP communication, a monitor (commonly referred to as a "sniffer") may be provided that may identify DTMF on the channel. Still further, a sessions border control may be provided that eliminates the call environment and includes logic for filtering/obfuscating the sensitive information (e.g., DTMF signals). Additionally, in other embodiments, the agent GUI may be eliminated or one or more fields may be dynamically activated/deactivated based on a determined state of the call. Accordingly, the specific embodiments described herein should be understood as examples and not limiting the scope of the disclosure.

The invention claimed is:

1. An outsource telephony call center system configured to provide a secure call environment for conducting a transaction on behalf of a client with a caller that is a customer of the client, the system comprising
   a call environment processor configured to connect, maintain, and disconnect a communication channel between the caller and an agent in the secure call environment;
   a memory coupled to the processor storing instructions executable by the processor to provide secure call environment functionality; and
   an agent device connected with the call environment processor over a network forming at least a portion of the communication channel;
   wherein the secure call environment operates outside of a client application, which provides direct access to caller account information, and is configured to
      create a single channel for the portion of the communication channel between the call environment processor and the agent device to transmit both voice and data signals;
      monitor the communication channel continuously for DTMF signals while the communication channel is open without establishing a separate bridge to the communication channel;
      continuously identify and block the DTMF signals from transmission over the single channel as DTMF signals for an entire duration of connection of the communication channel;
      record information entered by the caller corresponding to the DTMF signals without establishing a separate bridge to the communication channel; and
      transmit the caller entered information to the client application and over the single channel to the agent device without agent accessibility to the caller entered information; and
   wherein the agent device is configured to
      receive a request to override agent inaccessibility to data fields in the client application;
      request authorization for the requested override;
      if authorization is received for an override pursuant to the override request, allow the agent to enter caller information directly into the agent device and transmit the agent entered caller information to the client application; and
      generate a record of the override request for audit of override events.

2. The system of claim 1, wherein the communication channel is open throughout the transaction.

3. The system of claim 1, wherein the secure call environment comprises a private branch exchange.

4. The system of claim 1, wherein the secure call environment is further configured to obfuscate caller entered information from the agent.

5. The system of claim 4, wherein the graphical display provides an indication when the caller enters information.

6. The system of claim 5, wherein the indication is not discernible by the agent as the information entered by the caller.

7. The system of claim 5, wherein an audible tone is provided to the agent to indicate the user has entered information.

8. The system of claim 7, wherein the audible tone is not a DTMF tone.

9. The of claim 1 further comprising
   a listener module configured to determine when a caller is entering information; and
   a broker module configured to record the caller entered information.

10. The system of claim 1 further configured to
    determine whether the communication channel is opened between the agent and the caller;
    if it is determined that there is an open communication channel between the agent and the caller, generate a unique identification and associate the unique identification with an extension for the agent; and
    create unique identification-associated tables into which caller entered information is saved.

11. The system of claim 1, wherein the agent device is further configured to determine whether the caller entered information is valid.

12. A telephonic branch exchange for an outsource call center that handles customer calls for a client comprising
    a conference bridge for creating a communication channel between a caller and an agent for conducting a transaction on behalf of the client;
    a listener placed in continuous communication with the conference bridge without establishing a separate bridge to the communication channel and configured to determine if the caller is entering DTMF signals corresponding to information and continuously block the DTMF signals from transmission over the communication channel for an entire duration of the communication channel;
    a broker in communication with the listener and configured to store caller entered information via the DTMF signals independent of the agent and transmit the caller entered information to a client application outside of the telephonic branch exchange; and
    an agent device configured to
       receive the caller entered information from the broker;
       provide an indication to the agent that the caller entered information is received while obfuscating caller entered information from the agent;
       provide an override function to allow the agent to enter caller information directly into the agent device; and transmit the agent entered caller information outside of the telephonic branch exchange to the client application.

13. The telephonic branch exchange of claim 12 further configured to
generate a unique identification when the communication channel is created between the caller and the agent device, and
dispose of the unique identification upon termination of the communication channel.

14. The telephonic branch exchange of claim 13, wherein the broker is configured to generate tables associated with the unique identification to receive the caller entered information upon creation of the communication channel between the caller and the agent.

15. The telephonic branch exchange of claim 12, wherein the agent device is further configured to generate a record of the override request for audit purposes.

16. A method for providing a secure call environment on a telephonic branch exchange for an outsource call center that handles customer calls for a client, the method comprising
receiving a call on behalf of the client from a caller desiring to conduct a transaction with the client at a private branch exchange;
electronically requesting an extension identifier from an agent device within the secure call environment;
electronically creating a communication channel between the agent device and the caller;
electronically generating a unique identifier using the extension identifier, the unique identifier being associated with the communication channel;
tapping the communication channel, without establishing a separate bridge to the communication channel, continuously while the communication channel is open to connect a listener within the telephonic branch exchange;
continuously monitoring the communication channel via the listener for DTMF signals;
blocking DTMF signals received from the caller from transmission over the communication channel to the agent device for an entire duration of the call;
electronically receiving a request from the agent device to receive caller entered information, the request including the unique identifier;
converting the DTMF signals into the caller entered information;
electronically generating tables to receive the caller entered information;
electronically receiving the caller entered information into the tables;
transmitting the caller entered information outside of the telephonic branch exchange to a client system;
obfuscating the caller entered information from the agent;
passing the obfuscated caller entered information to the agent device;
receiving an override request from the agent device;
if authorization is received for an override pursuant to the override request, sending the authorization to the agent device to allow entry of spoken caller information directly into an application on the agent device;
transmitting the entered spoken caller information outside of the telephonic branch exchange to a client system; and
generating a record of the override request.

17. The method of claim 16 further comprising
determining whether the caller entered information is valid;
if the information is valid, passing the information to the application running on the agent device; and
if the information if invalid, receiving the override request from the application on the agent device.

18. The method of claim 16 further comprising recording the call between the agent device and the caller.

* * * * *